United States Patent Office 3,682,782
Patented Aug. 8, 1972

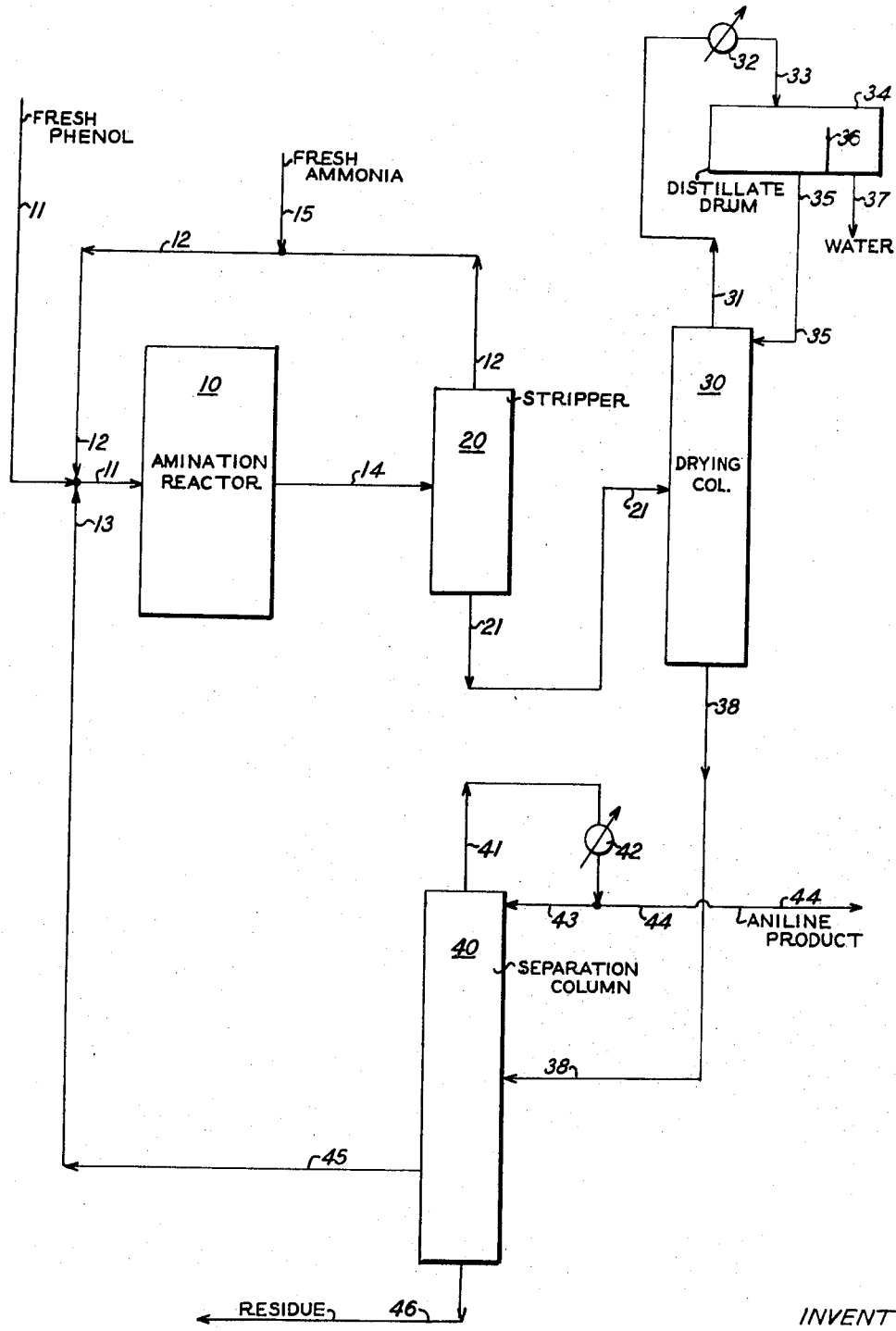

3,682,782
REDUCED PRESSURE DISTILLATION PROCESS FOR RECOVERING ANILINE FROM PHENOL-ANILINE MIXTURES
Chai Y. Choo, Westwood, N.J., assignor to Halcon International Inc.
Filed July 11, 1968, Ser. No. 744,056
Int. Cl. B01d 3/10; C07c 85/16
U.S. Cl. 203—91     2 Claims

ABSTRACT OF THE DISCLOSURE

High purity aniline is recovered from phenol-aniline mixtures containing more than one mole of aniline per mole of phenol by subjecting the aniline-phenol mixture to distillation at a pressure below about 600 mm. Hg. Recovery of aniline from mixtures containing water in addition to phenol and aniline is also possible by a distillation sequence involving removal of water by azeotropic distillation prior to separation of aniline from phenol.

BACKGROUND OF THE INVENTION

Methods of preparing aniline by amination of phenol are known; see U.S. Pat. No. 3,272,865. Such methods are commercially attractive but recovery of high-purity aniline from the effluent of such processes has proven difficult by other than chemical means and chemical means of separation are extremely expensive.

The vapor pressures of aniline and phenol are so similar as to suggest the essential impracticability of their separation by fractional distillation and are such that one skilled in the art would not expect sufficient change in relative volatility of aniline to phenol as system pressure is reduced to enable separation. ("Relative volatility" as used herein, means the ratio of the vaporization equilibrium constant of aniline to that of phenol and, for ideal systems, is equal to the ratio of the vapor pressures of the two components of a binary system.) Consideration of vapor pressure, for example, would indicate that a reduction in system pressure would increase relative volatility from about 0.94 at atmospheric pressure to only about 1.00 at about 300 mm. Hg and such relative volatilities clearly indicate that separation of these two materials by fractional distillation would be impractical at best.

However, aniline-phenol mixtures are non-ideal as evidenced by the formation of a maximum boiling azeotrope which, at atmospheric pressure, boils at 186° C. and contains 42% phenol. Despite the negative deviations from ideality indicated by this, however, atmospheric pressure separation is still impractical. It is also known that the azeotropic composition does not change significantly with pressure and, hence, using well-recognized correlations (see Robinson and Gilliland, "Elements of Fractional Distillation" 4th ed. (1950), pg. 56) changes in pressure would not be expected to improve separability by distillation sufficiently to render such separations practicable. For example, the relative volatility of aniline to phenol (@ ca. 60% aniline) at atmospheric pressure is only 1.04 and would be expected to be only 1.05 at 140 mm. Hg and such volatilities clearly indicate impracticability of separation.

Water, a by-product formed in the manufacture of aniline by the amination of phenol, complicates aniline recovery still further since water forms azeotropes both with phenol and with aniline.

SUMMARY OF THE INVENTION

Surprisingly, it has now been found that aniline can be separated economically from phenol by fractional distillation if the distillation is carried out at a pressure below about 600 mm. Hg. If the feed to the distillation is richer in aniline than the phenol-aniline azeotropic composition, as it is required by the nature of this invention to be, the overhead from the distillation can be as high a purity aniline as desired, and materials containing 98% aniline or more are readily obtained. Thus, the feed to this distillation must contain at least one mole of aniline per mole of phenol and can contain any greater proportion of aniline. The bottoms from the distillation can readily approach the phenol-aniline azeotropic composition as closely as desired but, clearly, cannot be poorer in aniline than that indicated by the azeotrope. Actual overhead and bottoms composition are of course varied to suit particular purity requirements. The high purity overhead product often can be used as such while the bottoms phenol-rich material is eminently suited for recycle to an amination process such as that of U.S. Pat. No. 3,272,865 for further conversion of phenol to aniline.

Accordingly, the separation process of this invention can easily be accomplished in a single distillation column of conventional design, equipped with the conventional appurtenances (reboilers, condensers, reflux drums, pumps, etc.). More than one distillation column can of course be used, though not necessary so to do. Distillation columns having from 15 to 50 theoretical vapor liquid contacting stages (hereinafter, for convenience, called "trays") and operating with column overhead pressures of about 150 mm. Hg and with reflux ratios of from about 2:1 to about 20:1 are adequate to give overhead aniline products of about 99.8 mole percent purity and bottoms products of about 52 mole percent purity when starting with a feed containing 95 mole percent aniline. Trays, reflux ratios and other factors can readily be selected for other conditions and other purities.

The presence of water in the feed complicates the separation of aniline from phenol since water forms low boiling azeotropes both with aniline and with phenol. Water can readily be removed from the phenolaniline mixture using conventional means known to those skilled in the art such as, for example, by use of desiccants or use of known azeotropic agents for water such as, for example, benzene and the like. Such methods suffer from the disadvantage of requiring the introduction of extraneous materials to the process. Accordingly another embodiment of this invention encompasses the removal of water from the phenol-aniline mixture prior to the above distillation by an azeotropic distillation without use of an extraneous azeotropic agent. According to this method, the ternary system phenol aniline-water is first fractionally distilled for removal of an overhead product approaching the aniline-water azeotrope, leaving an essentially water-free mixture of phenol and aniline as the bottoms product. Aniline is easily recovered from the azeotropic overhead mixture by condensation whereby a water phase and an aniline phase is formed. These phases are readily separated by simple decantation. This method is applicable to streams containing up to 70% (mole basis) of water though it is preferred to use feeds containing not more than 50% (mole basis) of water.

DESCRIPTION OF THE DRAWING

The attached drawing schematically depicts one embodiment of the invention, and for the sake of completeness, is described in conjunction with a phenol amination unit. Fresh phenol is fed to amination reactor 10 via conduit 11. Also fed to the amination reactor is ammonia (via conduit 12) and a recycle stream containing both phenol and aniline (via conduit 13). Disposed within reactor 10 is a catalyst, suitably in the form of a fixed bed. The catalyst employed is preferably one of those disclosed in U.S. Pat. No. 3,272,865 as being suitable for this reaction, e.g., a silica-alumina coated with 2% $V_2O_5$.

Within the reactor, the phenol and ammonia react to form aniline and water in accordance with the following chemical equation:

$$C_6H_5OH + NH_3 \rightarrow C_6H_5NH_2 + H_2O$$

Reactor conditions are controlled to give an effluent containing more than 1 mole of aniline per mole of phenol. Reaction temperatures broadly within the range of 300–600° C. pressures above atmospheric and preferably above 7 atmospheres, and space velocities of the order of 300 volumes of feed (measured at 0° C. and 760 mm. Hg pressure) per hour per volume of catalyst or less are suitable for this purpose. Aniline recycled to the reactor (together with phenol via conduit 13) passes through the reactor substantially unchanged and act somewhat as an inert.

Reaction products are withdrawn from reactor 10 via conduit 14 and are fed to stripper 20. Stripper 20 is a distillation column of conventional design adapted to strip unreacted ammonia from the amination effluent. Recovered ammonia is withdrawn from the stripper via conduit 12, compressed if necessary (compression facilities not shown), and admixed with fresh ammonia introduced to the system via conduit 15 and finally recycled to the amination reactor.

Reaction products, now essentially free of ammonia, are withdrawn from stripper 20 via conduit 21 and introduced to drying column 30. Drying column 30 is fractional distillation tower of conventional type adapted to give an overhead product which is essentially the aniline-water azeotrope (86.6 wt. percent water at 760 mm. Hg) and a bottoms which is an essentially water-free mixture of phenol and aniline. The drying column contains from about 5 to about 50 theoretical trays and operates at a reflux ratio of from about .05 to about .50 (reflux ratio being defined as moles of liquid reflux per mole of net overhead liquid product). Overhead vapor is withdrawn from drying column 30 via conduit 31, is condensed in heat exchanger 32 and passes to distillate drum 34 via conduit 33. Aniline and water being only slightly miscible, two liquid phases are formed in heat exchanger 32 and are separated one from the other under the influence of gravity in distillate drum 34. At moderate temperature (say 60° C. or less), aniline is heavier than water, settles to the bottom of the distillate drum and is withdrawn therefrom via conduit 35. This aniline stream is returned as reflux to drying column 30. Water, being lighter than aniline, rises, overflows weir 36 within distillate drum 34 and is withdrawn from the distillate drum via conduit 37. This water can be discarded or further treated (in facilities not shown in the drawing) to recover aniline dissolved therein. Of course, drying column 30 is equipped with reboiling facilities of conventional type which are not depicted in the attached drawing.

The essentially water-free phenol-aniline mixture is withdrawn from the bottom of column 30 via conduit 38 and is fed to the phenol-aniline separation column 40 which is a distillation column of conventional characteristics. In accordance with this inventon the overhead of phenol-aniline separation column 40 is maintained at a pressure below about 600 mm. Hg.

This column suitably contains from about 15 to about 50 theoretical trays and is operated with a reflux ratio between about 2.0 and about 20; reflux ratio being defined as moles of liquid reflux per mole of net overhead product. The overhead product of this column is a high-purity aniline stream which can be used as such or, if desired, subjected to further purification. This stream is withdrawn from column 40 via conduit 41 is condensed in heat exchanger 42 and is then divided into two streams. A portion is returned to column 40 via conduit 43 as reflux, the balance is the net aniline product of the process and is withdrawn from the system via conduit 44. The phenol-aniline azeotrope being less volatile than aniline itself, concentrates in a lower portion of column 40 and is withdrawn therefrom via conduit 45, communicating with conduit 13 and hence is recycled to the amination reactor 10. If desired, this stream can be treated (facilities not shown) in separate facilities for the removal of any high boiling materials formed in the amination reactor. Alternatively, to avoid the necessity for such separate treatment facilities the phenol-aniline azeotrope can be withdrawn as a sidestream several trays up from the bottom of column 40 to insure comparative freedom from heavy ends. In this case, as illustrated in the drawing, heavy ends are removed from the bottom of column 40 via conduit 46 and are discarded.

EXAMPLES

The following examples are presented to further illustrate this invention, but are not intended as limiting the scope thereof. Unless otherwise indicated, all parts and percents referred to in the following examples are on a weight basis.

EXAMPLE I

A mixture of phenol and aniline containing 64% aniline is fed continuously to a distillation column having 35 theoretical trays at a rate of 100 per hour. Overhead column pressure is maintained at 300 mm. Hg and the column is operated with a reflux ratio (defined as the molar ratio of reflux to net overhead product) of 6.5:1. Overhead product is aniline having a purity of 99.9% and the bottoms product is a phenol-aniline mixture (60% aniline) approaching the azeotropic composition.

Control A

Example I is repeated except that column overhead pressure is allowed to rise to atmosphere. Overhead product purity is only 87% far lower than normal aniline purity specifications. Even when the column is operated at total reflux, the liquid reflux composition (determined by sampling) is 98.9, still too low a purity.

EXAMPLE II

A mixture containing 92% aniline, 4% phenol and 4% water is fed to a 15 plate column at a rate of 100 parts per hour. Column overhead pressure is maintained at 150 mm. Hg and reflux ratio is controlled at 20:1. About 5% of the feed is taken as the overhead product and analyzed. Phenol content in the overhead vapor appears to be zero, aniline content is 22.3% and water content is 77.7%. The column overhead vapor is condensed, water is decanted and the aniline layer is returned to the column as reflux.

The bottoms from the above distillation is distilled in a second column having 60 trays, an overhead pressure maintained at about 150 mm. Hg and operated with a reflux ratio of 3.5:1. An overhead aniline product of 99.9% purity is obtained at a rate of 93.9 parts per hour.

EXAMPLE III

To continuous phenol amination apparatus is fed 15.09 parts per hour of a feed mixture of the following composition:

| | Parts/hr. |
|---|---|
| Ammonia | 11.00 |
| Phenol | 3.20 |
| Aniline | .35 |
| Water | .06 |
| Impurities | .48 |
| | 15.09 |

The above feed is made up of an admixture of 3.03 parts/hr. of fresh phenol, 0.57 part/hr. of fresh ammonia and recycle streams obtained as hereinafter described. The impurities are largely recycled gases (nitrogen and hydrogen) formed by ammonia decomposition.

The effluent from the amination reactor has the following composition:

| | Parts/hr. |
|---|---|
| Ammonia | 10.44 |
| Phenol | .18 |
| Aniline | 3.25 |
| Water | .64 |
| Impurities | .58 |
| | 15.09 |

Untreated ammonia and other light gases (11.00 parts/hr.) are stripped from the reactor effluent, compressed and recycled to the amination reaction; a small purge being taken to prevent excessive build-up of gaseous by-products. The remaining reaction product (4.09 parts/hr.) has the following composition:

| | Parts/hr. |
|---|---|
| Phenol | 0.18 |
| Aniline | 3.23 |
| Water | 0.58 |
| Impurities | 0.10 |
| | 4.09 |

This reaction product is introduced to a distillation column having 25 actual trays and operated with an internal liquid to vapor ratio at the top of the column of 0.72 (molar basis). Column overhead pressure is maintained at approximately 270 mm. Hg. Also added to this distillation column is 1.74 parts/hr. of benzene as reflux. The benzene serves as an azeotropic agent for water, thereby facilitating its removal from the reaction product. The bottoms from this distillation (3.51 parts/hr.) is an essentially water-free mixture of phenol and aniline (92.1% aniline, 5.1% phenol and the balance—2.8%—predominately high boiling residues formed in the amination).

This bottoms, now free of water, is fed to another distillation column contining a total of 75 trays, operated at a reflux ratio (moles of reflux per mole of net overhead product) of 3.5:1. Overhead column pressure is maintained at 140 mm. Hg. In this manner, 2.88 parts/hr .of aniline having a purity of 99.93% are obtained as the overhead product. A sidestream (ca. 0.5 part/hr.) is withdrawn from the fifteenth tray above the column bottoms for recycle to the amination. This sidestream contains approximately 65% aniline, 33% phenol and the balance being high-boiling residues. The column bottoms (0.12 part/hr.) is a purge of high boiling residue.

The foregoing description illustrates the methods of this invention whereby the advantages thereof are obtained. It will be understood that modifications and variations thereof may be effected by those skilled in the art without departing from the spirit of this invention. Accordingly, it is intended that all matter contained in the foregoing description shall be interpreted as illustrative and not in a limiting sense.

What is claimed is:

1. A process for recovering high purity aniline from a mixture consisting essentially of aniline and phenol said mixture containing at least one mole of aniline per mole of phenol which process comprises fractionally distilling said mixture in a distillation zone having an overhead maintained at a pressure less than about 600 mm. Hg.

2. A process for recovering high purity aniline from a mixture consisting essentially of aniline phenol and water said mixture containing at least one mole of aniline per mole of phenol and containing not more than about 70 mole percent water which process comprises fractionally distilling said mixture in a distillation zone having an overhead maintained at a pressure less than about 600 mm. Hg.

References Cited
UNITED STATES PATENTS

| | | | |
|---|---|---|---|
| 1,823,026 | 9/1931 | Britton et al. | 260—582 |
| 1,935,209 | 11/1933 | Herold et al. | 260—581 |
| 2,013,052 | 9/1935 | Horsley | 260—581 |
| 3,272,865 | 9/1966 | Barker | 260—581 |
| 3,347,921 | 10/1967 | Carrubba et al. | 260—581 |
| 3,361,818 | 1/1968 | Barker | 260—581 |
| 3,442,950 | 5/1969 | Barker | 260—581 |

OTHER REFERENCES

Horsley L. H.: Azeotropic Data; June 1952, American Chemical Society, Wash., D.C., pp. 318–322.

WILBUR L. BASCOMB, JR., Primary Examiner

U.S. Cl. X.R.

203—14, 73, 582